United States Patent [19]

Gebauer et al.

[11] Patent Number: 4,748,554

[45] Date of Patent: May 31, 1988

[54] MACHINE MONITORING SYSTEM USING MOTION DETECTION FOR SYNCHRONIZATION

[75] Inventors: Paul Gebauer; John D. Begin, both of Warren; Kenneth J. Cook, Troy, all of Mich.

[73] Assignee: GTE Valeron Corporation, Troy, Mich.

[21] Appl. No.: 896,417

[22] Filed: Aug. 14, 1986

[51] Int. Cl.$^4$ .................. G06F 15/46; G05B 23/02
[52] U.S. Cl. .................. 364/474; 318/565; 364/153; 364/184
[58] Field of Search .............. 364/474, 475, 142, 148, 364/153, 154, 167–171, 180, 184–187; 318/561, 565, 568, 590, 569

[56] References Cited

U.S. PATENT DOCUMENTS

| | | | |
|---|---|---|---|
| 3,784,798 | 1/1974 | Beadle et al. | 364/475 |
| 4,033,206 | 7/1977 | Morita et al. | 364/474 X |
| 4,078,195 | 3/1978 | Mathias et al. | 364/474 X |
| 4,279,013 | 7/1981 | Cameron et al. | 364/474 X |
| 4,498,259 | 2/1985 | Yamamoto et al. | 364/474 X |
| 4,532,599 | 7/1985 | Smith | 364/474 X |
| 4,547,847 | 10/1985 | Olig et al. | 364/474 X |
| 4,584,649 | 4/1986 | Komanduri et al. | 364/475 |

Primary Examiner—Joseph Ruggiero
Attorney, Agent, or Firm—Harness, Dickey & Pierce

[57] ABSTRACT

Apparatus and methods are disclosed for use in monitoring the operation of an automated machine tool which has at least one linear slide axis. Motion along the various machine axes is detected and used to provide an output signal for synchronizing the comparison of real time monitored parameters with previously stored data which varies depending upon the operational stage of the part cycle in which the machine tool is operating. In one embodiment, a plurality of sections are stored in a memory. Each section contains limit values associated with normal characteristics of parameters such as power, vibration, acoustical emission and the like which occur during a given operational stage. A preselected detected change in motion along any of the slide axes initiates the generation of a new section of limit values to be used during the comparison. Provision is also made for inhibiting the comparison when the motion information indicates that the machine is not presently removing metal from the workpiece.

20 Claims, 5 Drawing Sheets

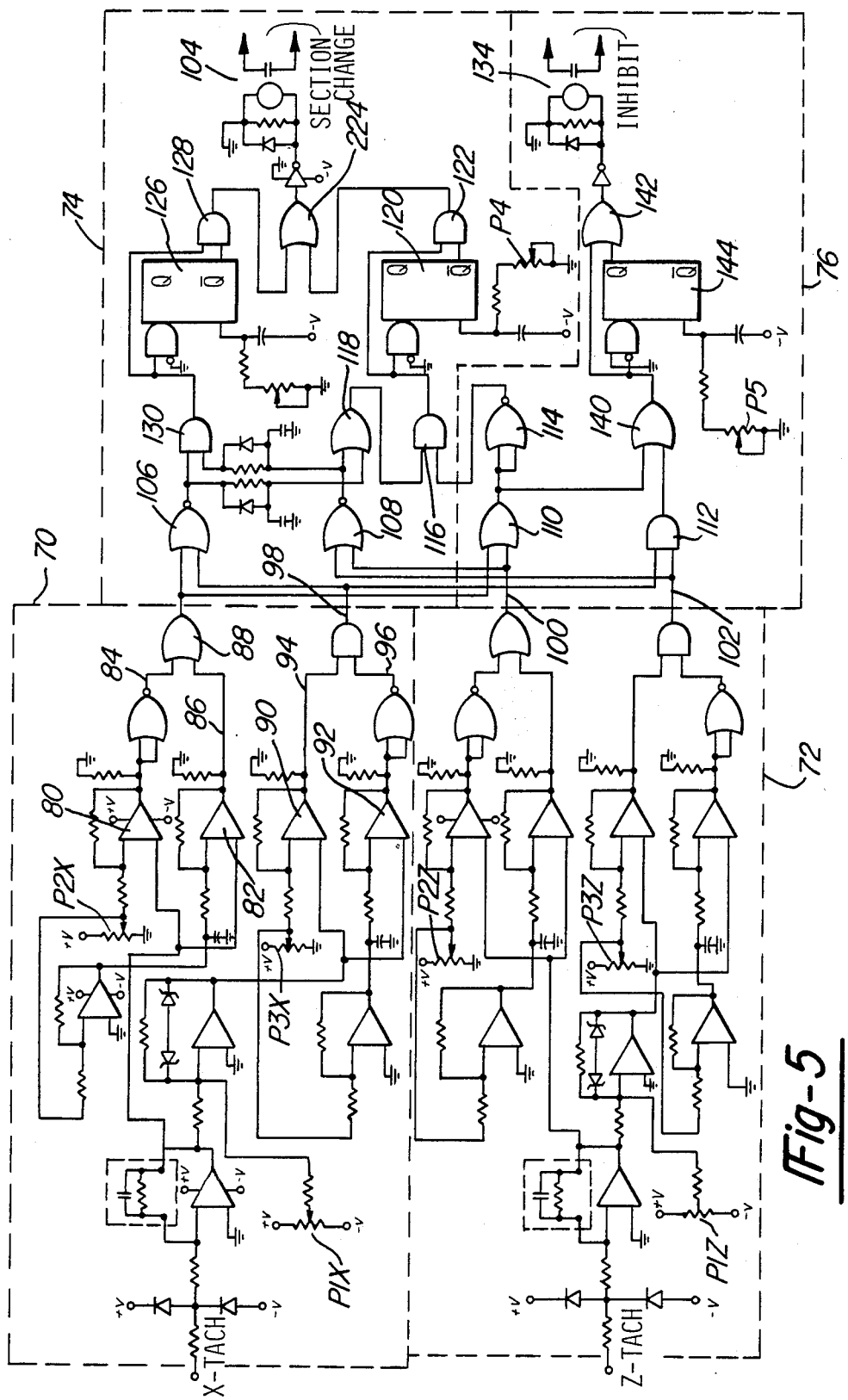

MACHINE MONITORING SYSTEM USING MOTION DETECTION FOR SYNCHRONIZATION

TECHNICAL FIELD

This invention relates to automated machine tool systems and, more particularly, devices for monitoring their operations.

BACKGROUND ART

Many of today's more sophisticated machine tools require little, if any, human operator intervention. As a result, there is an increasing need for monitoring systems that operate to check various parameters such as power consumption, force, torque, vibration, acoustical emission and the like during the machining process to ensure that there has not been some detrimental occurrence that may have otherwise been detected by the human operator.

Various monitoring systems for machine tools are known in the art. One such monitoring system is sold by the assignee of the present invention under the trademark "Tool Sense". U.S. Pat. No. 4,279,013 which is also assigned to the present assignee is representative of patent literature on the subject of machine tool monitors. In general, these monitoring systems are used to compare real time sensed parameters with preset limits. For example, the parameter may be power and the monitoring system is adapted to compare instantaneous power consumption of the machine with high and low limit values. If these limit values are exceeded then the monitoring system provides an output signal which is used to alter the machining operation so as to avoid catastrophic problems. Some of the more sophisticated monitoring systems can monitor more than one parameter at the same time.

Typically, a machine tool is used to remove the metal from a workpiece in a part cycle which includes several different operational stages. Some of the known machine tools such as the more sophisticated machining centers will operate in a number of different operational stages during a part cycle such a milling, drilling, boring, facing, spotting, counterboring, threading and tapping on four or more faces of the workpiece in a single setup. Machines of this type often have automatic tool changing capabilities in which the tools are stored in a magazine or matrix and are accessed by tool changing mechanisms. Upon completion of an operational stage, a new tool from the magazine is automatically interchanged with the tool in the machine spindle and the tool taken from the spindle is returned to the storage magazine.

It can be appreciated that there is a need to change the limit values depending upon the operational stage that the machine is undergoing. For example, it can be expected that more power will be used during a particular milling operation than is normally used for another type of operational stage. Therefore, in order to ensure accurate monitoring it becomes necessary to use different limit values during different operational stages. In the past, this has been accomplished by storing limit values in blocks or sections in a memory. Each section is associated with a particular operational stage. The limit values can be manually programmed by an operator or chosen automatically by using a so-called "learn" mode where a successful part cycle has been performed on a workpiece.

Unfortunately, it has been difficult to know when to use each section's parameters during the comparison process while the machine is operating. In other words, it is often hard to synchronize the variable protection limit data with the operational stage that the machine is undergoing. One attempt to accomplish this synchronization process is to have the machine controller generate certain codes (often referred to as "M" codes) at various times during the part cycle program. Unfortunately, these codes are not universally available from all machines and, if available, only a limited number of them can normally be used for this purpose.

SUMMARY OF THE INVENTION

Pursuant to the present invention, motion along the various machine axes is detected and used to provide an output signal for synchronizing the comparison of real time monitored parameters with previously stored data which varies depending upon the operational stage of the part cycle in which the machine tool is operating. In one embodiment, a plurality of sections are stored in a memory. Each section contains limit values associated with parameters such as power, vibration, acoustical emission and the like which are sensed during the machining operation and whose normal fluctuations tend to vary between any given operational stage. A predetermined detected change in motion along any of the slide axes initiates a generation of a signal which can be used to select a new section of limit values to be used during the comparison. Provision is also made for inhibiting the comparison process when the motion information indicates that the machine is not currently removing metal from the workpiece.

BRIEF DESCRIPTION OF THE DRAWINGS

The various advantages of the present invention will become apparent to one skilled in the art upon reading the following specification and by reference to the drawings in which:

FIG. 5 is a schematic diagram of circuitry for the motion monitor made in accordance with one embodiment of the present invention.

DESCRIPTION OF THE PREFERRED EMBODIMENTS

Figure 1:
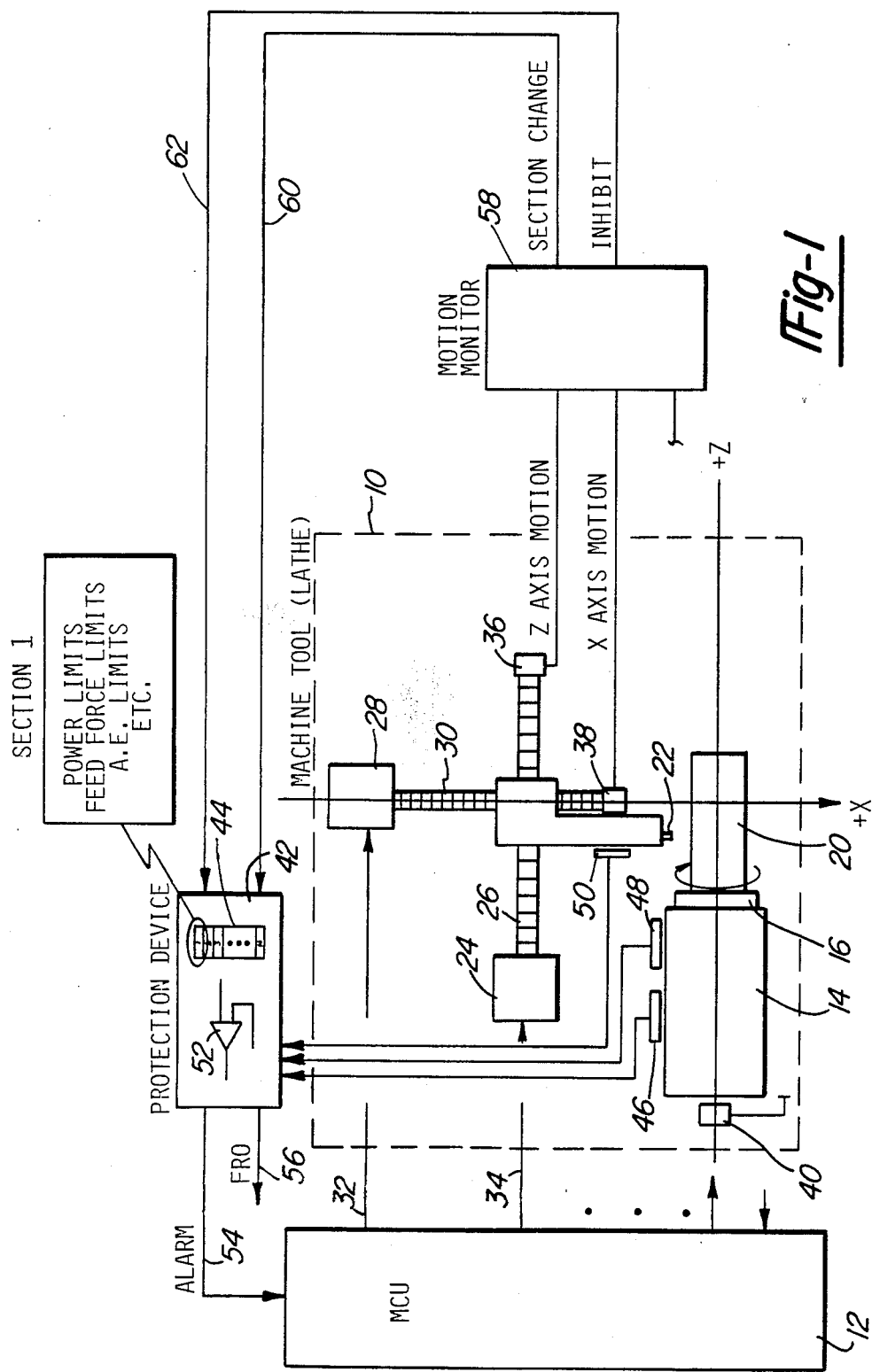
FIG. 1 is a block diagram which schematically illustrates the teachings of the present invention in connection with a simplified diagram of a machine tool.

In FIG. 1 there is shown a machine tool 10 such as a lathe operating under the control of a machine control unit (MCU) 12. It should be noted from the outset that the present invention has applicability with a wide variety of different automated machine tools and therefore this specific example should not be considered as limiting. Most machine tools can be characterized by some combination of linear slide motion and rotating motion. In the illustrated machine tool 10 there is shown a machine spindle 14 having a chuck 16 designed to rotate a workpiece 20 about an axis which is labeled Z. Tool 22 is designed to move along the axis Z and a perpendicular axis X. The motion of tool 22 is conventionally controlled by a drive motor and lead screw arrangement well known in the art. In FIG. 1, drive motor 24 and lead screw 26 is used to control motion of tool 22 along the Z axis. Similarly, drive motor 28 and lead screw 30 is used to control tool motion along the X axis.

Figure 2:
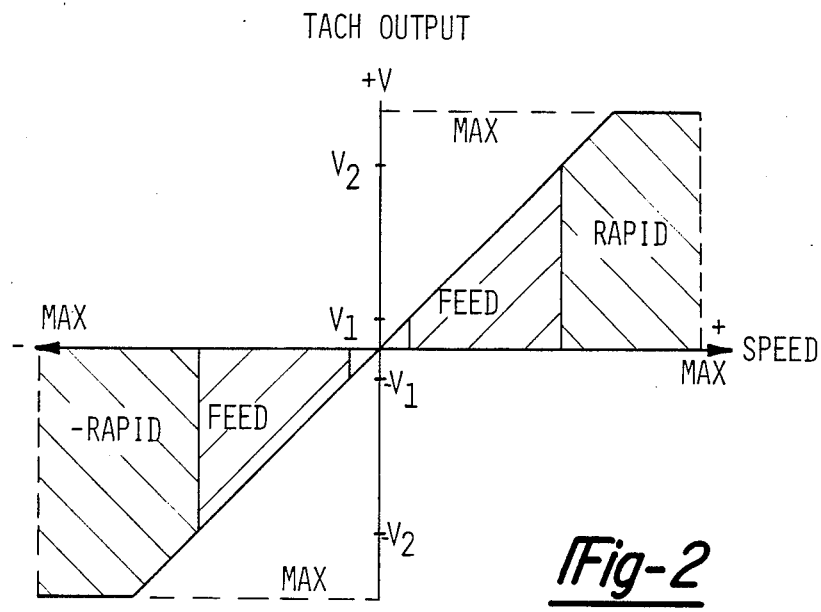
FIG. 2 is a graph useful in understanding the relationship between the output of a tachometer coupled to a linear slide axis of the machine and the speed of motion along that axis.

The machine control unit 12 is typically what is known in the art as a numerical controller (NC) or computer numeric controller (CNC). In either case the control unit 12 generally operates under the control of a stored program and compares the programmed position data with a feedback signal of actual position of the tool 22. Any error will generate a signal (e.g., on lines 32 and 34) to run the drive motors in the proper direction to cancel the errors. The feedback signal can be generated by a variety of different devices such as resolvers, optical encoders, tachometers and the like. The present invention is especially well suited for use with tachometers which bear the reference numerals 36 and 38 for the Z and X axes, respectively. Tachometers provide an analog output signal which is proportional to speed as is shown in FIG. 2. As will be explained later herein, by appropriately selecting certain threshold voltage limits it is possible to determine whether the tool 20 is stopped, in a normal feed condition or is in a rapid transit condition. For example, any tach output less than $\pm V_1$ is defined as a stop condition and a tach outputs in excess of $\pm V_2$ is a rapid transit condition whereas tach output between $\pm V_1$ and $\pm V_2$ is a normal feed condition. As is known in the art, the tool 22 can be moved very quickly to one position or another without removing metal in order to rapidly position the tool. This high speed movement will be referred to as a rapid transit condition. When the tool 22 is in the process of removing metal from workpiece 20, this will be referred to as a feed condition. When tool 22 is stopped, this will be referred to as a stop condition.

Other motion of the machine tool can be similarly detected. For example, there is shown an additional tachometer 40 for detecting rotary motion of spindle 14.

A protection device 42 is provided for monitoring real time parameters during the machining operation and comparing them with data previously stored in a memory 44. The data in memory 44 can take a variety of forms. It may take the form of a time varying signature of a waveform from a given sensor or group of sensors used to sense parameters such as power, force, vibration, torque and acoustical emission. Such signatures can be derived by using a so-called "learn" mode where a part is made with a new tool and other optimum parameters in a successful part cycle to establish normal variations in the monitored parameter. Alternatively, the data may be stored in blocks or sections in memory 44 which are labeled 1 through N in FIG. 1. Each section contains limit values for one or more parameters. The expanded block in FIG. 1 shows that the section 1 has limits therein for power, feed force and acoustical emission (A.E.). These parameters are sensed in real time by suitable sensors such as power sensor 46, acoustical detector 48 and feed force sensor 50. Each section is associated with a given operational stage in the part cycle. Thus, the limit values in each section are usually different since the normally expected extreme values of the sensed real time parameters will likewise be different depending upon the operation being performed in that stage. For purposes of this invention, the term "operational stage" means a segment of the part cycle that is usually characterized by some change in tool feed speed or rotary motion.

The protection device 42 includes some form of a comparison circuit which is schematically illustrated by the numeral 52. Comparison circuit 52 operates to compare each of the monitored real time parameters with their respective limits in the selected section. If the real time values exceed their limits then the protection device 42 operates to provide an output signal which alters the machining operation. Typically, device 42 provides one or more output signal lines such as line 54 labeled "alarm" which is used to shut down the machine operation. For example, the machine can be shut down when the comparison indicates that there is a broken tool or other likely failure in the machine tool 10. Alternatively, protection device 42 can be used in an adaptive mode to control the feed rate to maintain the machining operation so that one or more parameters stay within predefined limits. The line 56 labeled "FRO" for feed rate override represents this function.

A suitable example of a protection device is disclosed in the aforementioned U.S. Pat. No. 4,279,013 which is hereby incorporated by reference. From the foregoing, it can be appreciated that there is a need for synchronizing the comparison of the real time parameters from sensors 46-50 with the stored data, e.g. limit values, in memory 44. Otherwise, the system will not know which limit values should be used for comparison. To this end, a motion monitor 58 is provided for sensing motion along at least one machine axis and generating an output signal for synchronizing the comparison of the real time monitored parameters with the previously stored data, which data changes depending upon the operational stage of the part cycle as noted above. As will appear, the motion monitor 58 can be implemented in a variety of ways. Suffice it to say that it has inputs which are designed to receive the outputs of the motion sensors such as tachometers 36, 38 and 40. Monitor 58 is coupled to the protection device 42 and will provide an output signal for selecting the appropriate protection limits as a function of the detected motion from the sensors.

In this particular embodiment, the sections are stored in a predetermined order, preferably sequentially, in memory 44. In other words, there is some logical progression of the section memory locations that correlate in some manner to the progression of operational stages in the part cycle. This is because the monitor 58 simply provides an output on line 60 which tells the protection device 42 to shift to the next section for use in the comparison. For example, during the first operational stage the parameters of section 1 will be used in comparison circuit 52 as the extreme values for the real time parameters for that operational stage. When the motion monitor 58 detects that the machine tool 10 has entered the next operational stage, it will initiate a signal on line 60 to cause the protection device to select the section 2 parameters for the comparison in that operational stage. This process continues throughout the part cycle. For purposes of this invention, the term "part cycle" means the process by which metal is removed from a workpiece in one or more operational stages.

Pursuant to a feature of this invention, motion monitor 58 provides an additional output signal on line 62 which is used to temporarily disable or inhibit the comparison process in comparison circuit 52. The inhibit signal on line 62 is generated as a function of certain detected motion conditions. In particular, the inhibit signal is designed to be generated when machine tool 10 is not cutting the workpiece but instead is doing some other set up or post-processing functions such as high speed retraction of the tool 22.

Figure 3:
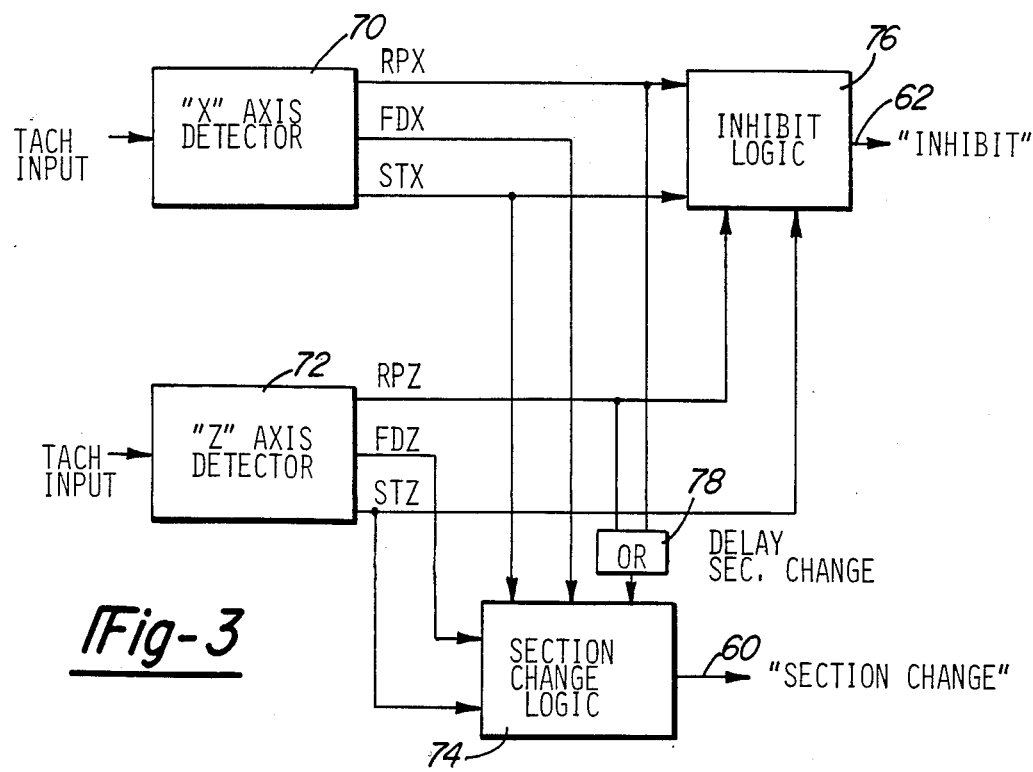
FIG. 3 is a block diagram of a motion detector made in accordance with the present invention.

FIG. 3 schematically illustrates the functional characteristics of motion monitor 58 in this embodiment. Each axis has a detector such as detector 70 for the X axis and detector 72 for the Z axis. The function of each detector is to provide output signals which indicate the status of the motion along its associated axis. One method of doing this is to internally set voltage reference levels associated with $\pm V_1$ and $\pm V_2$ with reference to FIG. 2. If the tach input is below $\pm V_1$ then the detector provides an output signal indicating that there is no motion along that axis, i.e., it is in a stop condition. If the tach output is above $\pm V_1$ but below $\pm V_2$ then the detector provides an output indicating that the tool is in a normal feed condition. If the tach output is above $\pm V_2$ the detector provides an output indicating that the motion is in a rapid transit condition. As can be seen in FIG. 2, the tach output is negative if the motion is in an opposite direction but will be of the same absolute magnitude per unit of speed as in the other direction.

In FIG. 3, the X axis detector 70 provides an output on the line labeled STX when a stop condition is detected, an output on the line labeled FDX when a feed condition is detected and an output on line labeled RPX when a rapid transit condition is detected along the X axis. Similarly, Z axis detector 72 provides outputs on lines labeled STZ, FDZ and RPZ when stop, feed and rapid transit conditions, respectively, are detected along the Z axis. These outputs are connected to certain decisional logic designed to generate the "section change" and "inhibit" signals. Logic 74 operates to generate the "section change" signal on line 60 when any of the following motion conditions are sensed:

(a) when all axes are in a stop condition and then at least one axis goes to a feed condition;
(b) when one axis is in a feed condition and the motion in at least one other axis goes from a stop condition to a feed condition; or
(c) when all axes are in a feed condition and one axis goes to a stop condition.

Each of these three occurrences is normally associated with the beginning of a new operational stage. Consequently, when these motion conditions are met the monitor 58 via logic 74 generates the section change signal to cause the protection device 42 to select the next section of limits from memory 44.

With additional reference to FIG. 2 it can be seen that when motion goes from a stop condition to a rapid transit condition that the tach output must traverse through voltage levels that are normally associated with a feed condition. As noted above, one of the conditions in which a section change signal is generated is when motion goes from a stop condition to a feed condition. In order to prevent premature activation of the section change signal when motion goes from a stop condition to a rapid transit condition there is provided a delay 78 which delays the initiation of the section change signal for a sufficient period of time to allow the tachometer signal to tranverse from below $V_1$ to above $V_2$ if such is the case.

The inhibit logic 76 is designed to generate its inhibit signal when the motion conditions indicate that machine tool 10 is not undergoing any metal cutting operation. As noted above, the inhibit signal temporarily disables the comparison process in protection device 42 under these conditions. In the preferred embodiment, inhibit logic 76 operates to generate its inhibit signal on line 62 when any of the following conditions are detected:

(a) when motion along all axes is stopped; or
(b) when there is a rapid transit condition on any of the axes.

It follows that if the tool 22 is not moving in any direction then it is unlikely that any metal removing functions are being performed and thus there is no need for monitoring to make sure that the parameters are within limits. Similarly, if the tool 22 is in a rapid transit condition it is most likely that the tool is just being quickly moved to a given position which is often referred to as "air cut" feed rate. This condition likewise does not normally require any need for monitoring the parameters.

Figure 4A:
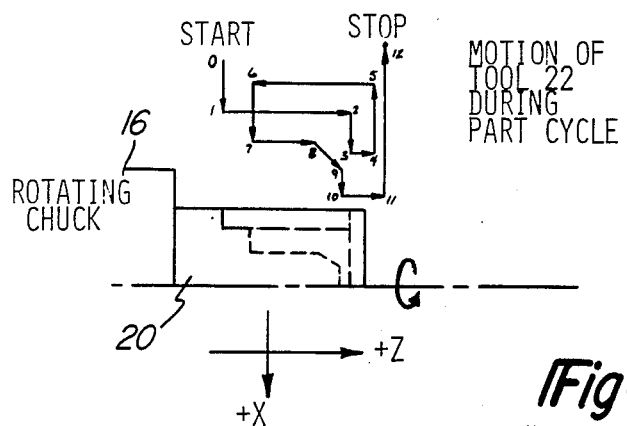
FIG. 4(A) is a view which pictorially illustrates the movement of a tool during a part cycle.
Figure 4B:
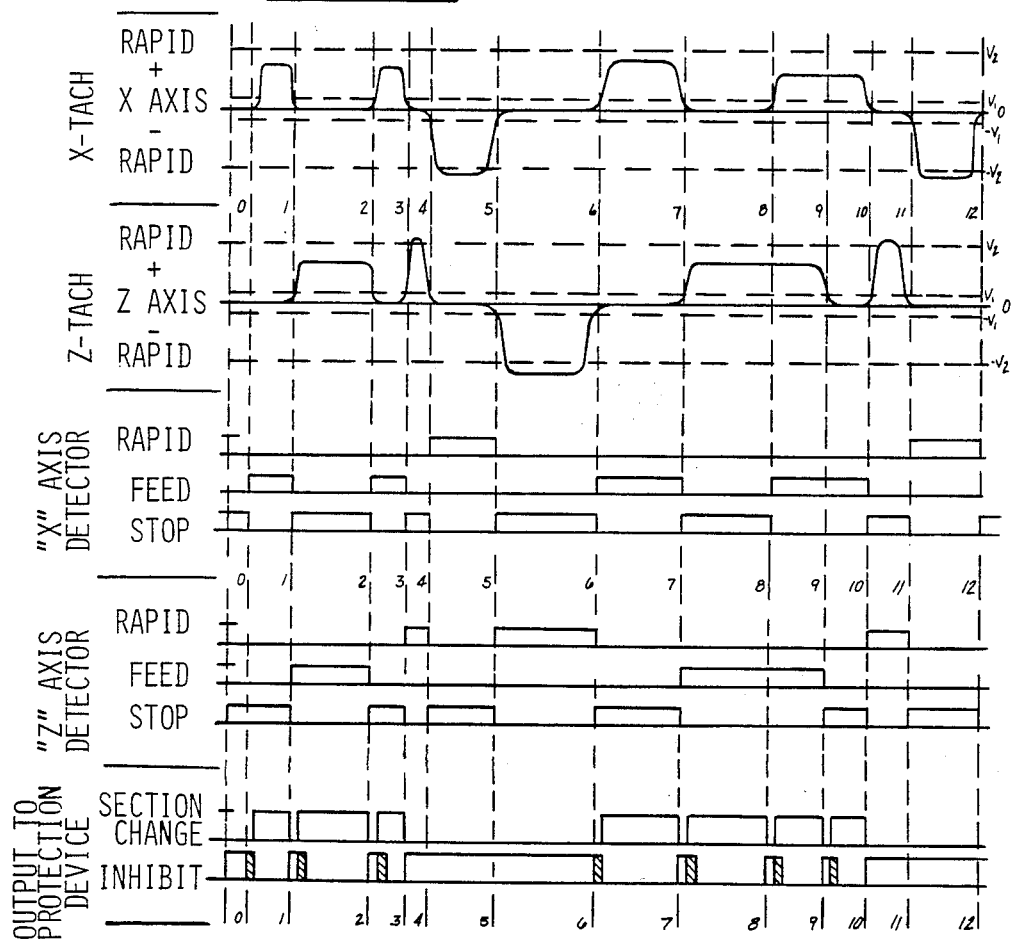
FIG. 4(B) is a waveform diagram showing signals generated during the various stages in the part cycle as illustrated in FIG. 4(A)

The illustrations in FIGS. 4(A and B) are helpful in understanding the method of operation of the present invention. For purposes of illustration assume that the MCU 12 has a program stored therein which causes the tool 22 to move in the directions illustrated by the arrows in FIG. 4(A) during a part cycle. For example, the part cycle includes motion from the starting point labeled "O" to the point labeled 1 in the +X direction. This operation would make a cut in the periphery of the workpiece 20 (as indicated by the dotted lines thereon). Referring to FIG. 4(B) between the points 0 and 1, it can be seen that the tachometer output monitoring the X axis motion has exceeded VI. The X axis detector senses this condition and generates a logical high output on the line labeled "FEED". Since the motion along the X axis has gone from a stop condition to a feed condition the section change logic 74 initiates a logical high signal on its output line after an appropriate delay. The thus generated section change signal is fed to the protection device 42 which causes the first section's parameters to be used in the comparison process.

During the next operational stage, the tool moves from point 1 to 2 along the plus Z axis direction. The Z tachometer output signal thus exceeds VI which is detected by the Z axis detectors 72 as a feed condition. Again, after an appropriate delay, the section change signal again goes high so that the protection device 42 can load in the next section's parameter limits. The next section or section 2 parameter limits will be associated with the operational stage that the machine is currently in the part cycle. In such manner, the motion monitor serves to synchronize the selection of the protection criteria with the point in the part cycle that the machine tool is in.

The inhibit signal is generated, for example, between points 3 to 4, 4 to 5, and 5 to 6 where the tool 22 is moved rapidly without doing any metal cutting operations. A study of the diagram of FIG. 4(B) illustrates that between points 3 and 4 the Z tach signal exceeds $V_2$ which is detected by the Z axis detector as a rapid transit condition. The rapid transit condition, as noted above, generates the inhibit signal by inhibit logic 76. In some protection devices such as the Assignee's "Tool Sense" device it is advisable to delay the cessation of the inhibit signal and this is illustrated in FIG. 4(B) by the cross hatching in the inhibit pulses.

This process continues, for the remainder of the part cycle. It should be understood that the above example is just for illustration and that the programmed tool movement on an actual part may be different.

Figure 6:
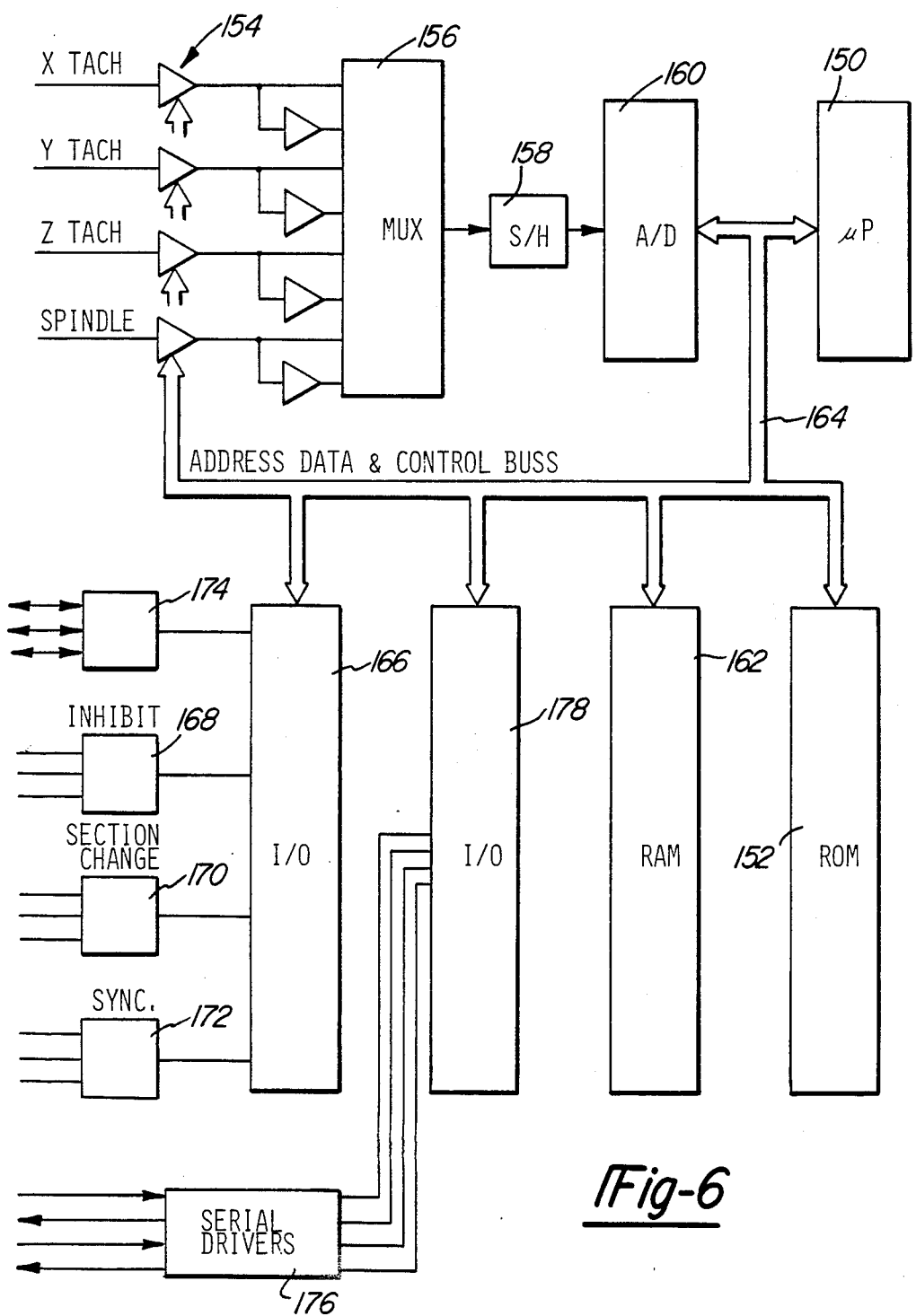
FIG. 6 is a block diagram of an alternative embodiment of the motion monitor using a programmable microprocessor instead of the fixed logic of the embodiment of FIG. 5.

The aforementioned functions can be implemented with hard-wired logic or under programmed microprocessor control. FIG. 5 illustrates a suitable hard-wired logic approach whereas FIG. 6 illustrates a microprocessor controled software implementation. With respect to FIG. 5, the individual components therein which make up the functional blocks in FIG. 3 are enclosed with dotted lines to the extent possible. The circuitry of FIG. 5 is implemented with well known logicial gates, resistors and other components. Consequently, it is not necessary to provide a detailed explanation of the function of each component in order to enable one skilled in the art to make and use the invention. Briefly, the potentiometer P1X is used for offset adjustment purposes as is known in the art. Potentiometer P2X determines the rapid transit threshold $\pm V_2$. Comparators 80 and 82 compare the X tach input signal with the rapid transit threshold and provide a logical high signal on line 84 when the X tach input signal is above $+V_1$ and a logical high on line 86 when the Z tach input is more negative than $-V_2$. Thus, the output of OR gate 88 goes high whenever there is a rapid transit condition along the X axis in either direction. Potentiometer P3X sets the threshold level $\pm V_1$ for the stop condition. Comparators 90 and 92 compare the X tach signal with the stop threshold. The output on line 94 will go high when the X tach output is less than plus $V_1$ whereas the output on line 96 will go high when the X tach output is less negative than $-V_1$. Thus, the output on line 98 will be at a logical high level when the motion along the X axis is in a stop condition.

The circuitry for the Z axis detector 72 is substantially the same as the X axis detector 70 and therefore shall not be described in detail herein. Suffice it to say that the output on line 100 will be at a logical high condition when there is a rapid transit condition along the Z axis whereas a logical high on line 102 signifies that there is a stop condition along the Z axis.

The section change logic circuitry 74 will energize a relay 104 or the like to generate the section change signal under the conditions described above. The output of NOR gate 106 signifies a feed condition along the X axis whereas a high on the output of NOR gate 108 signifies a feed condition along the Z axis. OR gate 110 will go high when either axis is in a rapid transit condition whereas AND gate 112 will go high when all axes are in a stop condition.

NOR gate 114 is wired such that its output will be in a high state when there are no rapid transit conditions detected. The output of NOR gate 114 is coupled to AND gate 116 which will go high whenever it receives a high output from exclusive OR gate 118 and there are no rapid transit conditions detected as signified by the high output on NOR gate 114. By way of an example, assume that both axes are in a stop condition and then the X axis goes to a feed condition. The output of NOR gate 106 will go high whereas the output of NOR gate 106 remains low. This exclusive OR condition causes gate 118 to go high and likewise gate 116 to go high. This causes the one shot multivibrator 120 to provide an output on its $\overline{Q}$ output after an appropriate delay set by potentiometer P4. The time of the delay is set to allow the tach signal to transverse to above the rapid transit threshold if such is the case. Consequently, AND gate 122 will go high after the delay and will energize the relay 104 via OR gate 124 to generate the section change signal. Multivibrator 126 operates in a similar manner when other section feed conditions are detected such as when gate 130 goes high under such instances where the X axis is in a feed condition and then the Z axis enters into the feed condition. In summary, the section change signal is generated whenever there is a feed change along either axis and there are no rapid transit conditions detected along any of the axes.

As noted above the inhibit circuitry 76 generates an inhibit signal via the closure of relay 134 whenever all axes are in a stop condition or there is any rapid transit condition detected. Under either of these conditions OR gate 140 will go high and cause the generation of the inhibit signal almost immediately by activating OR gate 142. Multi-vibrator 144 is designed to delay the cessation of the inhibit signal for a period of time determined by potentiometer P5. While not critical to this invention, this aspect does have utility in some types of protection devices such as the aforementioned Assignee's "Tool Sense" machine.

The program controlled microprocessor version in FIG. 6 includes a conventional microprocessor 150 operating under instructions in a program stored in memory such as ROM 152. The motion sensors such as the X tach, Y tach, Z tach and spindle motion sensors are coupled through certain preconditioning circuitry such as buffers, auto-scalers and the like which are generally designated by the numeral 154 into a multiplexer network 156. The multiplexer is used to select one of the motion sensor inputs and couple it to its output which is connected to a sample and hold circuit 158 which is in turn coupled to analog to digital converter circuit 160. The motion data can be stored in memory such as RAM 162 over bus 164. The stored data can be used in a variety of manners. For example, it can be used to derive a motion signature which is a function of one or more of the motion sensor inputs. This real time signature can be compared against a stored motion signature derived during a learn mode. In addition to, or alternatively, the real time motion data along each axis can be compared against previously stored motion data in the manner provided by the hard wired logic circuitry of FIG. 5. In either case, suitable input/output circuitry such as parallel I/O 166 is used to selectively enable certain outputs such as the inhibit signal generation circuit 168, or the section change circuit 170. The functional block 172 represents a more sophisticated approach than just generating a section change signal. The output from the synchronization circuit 172 can contain sufficient information to tell the protection device 42 more precisely at what point the machine tool 10 is in in its part cycle. For automatic recovery (i.e., if the process is stopped and backed up one or more program "blocks"), this system would automatically resynchronize the protect/monitor with the CNC or NC program. This could also be accomplished through the serial communication lines with the CNC control. This approach would provide an even more finely turned comparison process. The parallel I/O 166 can also communicate with relays and other I/O modules represented by the functional block 174. Versatility can be achieved by providing serial drivers 176 which communicate with the microprocessor bases system of FIG. 6 by way of serial input/output circuitry 178. In such manner, communication can be established with such external devices as a host computer, CNC controller and the like.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. In an automated machine tool having at least one linear slide axis, said tool being adapted to remove metal from a workpiece in a part cycle having a plurality of operational stages, said operational stages having different stored data associated therewith which defines acceptable criteria for a given parameter during machining of the workpiece, the improvement wherein means are provided for sensing motion along at least one axis and generating an output signal for synchronizing the comparison of said parameter as sensed in real time with the appropriate previously stored data; and means for coupling the output signal to monitoring means for making said comparison and selectively altering machine operation as a function of the comparison.

2. The improvement of claim 1 wherein the machine tool includes a plurality of linear slide axes, motion along at least two of the axes being detected and used to provide decisional information to determine which operational stage the machine is currently in, and whereby said output signal is a function of the detected motion along said two axes.

3. A method of monitoring an automated machine tool having at least two linear slide axes, said tool being adapted to remove metal from a workpiece in a part cycle having various operational stages, said method comprising:
   storing data in a memory associated with normal variations of a given parameter during various operational stages in the part cycle;
   sensing motion along the linear slide axes;
   using the sensed motion as decisional information to provide an output signal indicative of the operational stage that the machine is currently in;
   sensing said parameter in real time during the machine part cycle;
   using said output signal to synchronize the comparison of said sensed real time parameter with said previously stored data; and
   altering the machine operation if said comparison indicates that the real time parameter differs from the stored data by a given amount.

4. The method of claim 3 wherein said data is stored in sections, each section being associated with a given operational stage, the improvement which further comprises:
   storing said sections in sequential order in said memory; and
   using said output signal to shift to the next section for use of its data in said comparison.

5. The method of claim 4 wherein said output signal is generated when any one of the following motion conditions are sensed and there are no rapid transit conditions sensed:
   (a) when all axes are in a stop condition and then at least one axis goes to a feed condition;
   (b) when one axis is in a feed condition and the motion in at least one other axis goes from a stop condition to a feed condition; or
   (c) when all axes are in a feed condition and one axis goes to a stop condition.

6. The method of claim 5 which further comprises the step of:
   generating an inhibit signal to disable said comparison when given motion conditions are detected.

7. The method of claim 6 wherein said inhibit signal is generated under any of the following conditions;
   (a) when motion along all axes is stopped; or
   (b) when there is a rapid transit condition on any of the axis.

8. The method of claim 5 wherein motion is detected along each axis by a tachometer which provides an output signal proportional to speed of motion along the axis, and wherein said stop, feed or rapid transit conditions are detected by comparing the output signal from each tachometer to preselected threshold levels.

9. The method of claim 8 wherein a stop condition is detected when the output from the tachometer falls below a first threshold, wherein a rapid transit condition is detected when the tachometer output signal exceeds a second threshold, and wherein a normal feed condition is detected when the tachometer output signal is between said first and second thresholds.

10. The method of claim 9 wherein the generation of said output signal is delayed by a predetermined amount to permit sufficient time for the tachometer signal to traverse from below the first threshold to above the second threshold in the event of a rapid transit condition whereby the output signal is not falsely generated when the motion goes from a stop to a rapid transit condition.

11. The method of claim 3 wherein the machine includes a spindle, with spindle motion being detected and used as additional decisional information.

12. In a system for monitoring an automated machine tool adapted to remove metal from a workpiece in a part cycle having various operational stages, said machine tool having a plurality of axes along which linear slide motion takes place, said system including protection means including a memory for storing a plurality of sections, each section containing at least one limit value for a given parameter, each section being associated with a given operational stage wherein the limit values in each section are preselected depending upon the characteristics of the given parameter that are normally encountered during each operational stage during the part cycle, said protection means including comparison means for comparing the limits in selected sections with real time values of the parameter that are actually sensed while the machine is in operation, said protection means being adapted to provide an output signal to alter the operation of the machine if the real time values exceed the selected limit values, wherein the improvement comprises:
   sensor means for detecting motion along at least one of the linear slide axes of the machine; and
   motion monitor means connected between the sensor means and the protection means, adapted to generate a first output signal for selecting a given section from the memory to be used in the comparison; said output signal being generated as a function of the detected motion from the sensor means.

13. The improvement of claim 12 wherein said motion monitoring means is further adapted to generate a second output signal to inhibit the comparison under certain detected motion conditions.

14. The improvement of claim 12 wherein said sections are stored in sequential order in the memory, with the receipt of each of said first signal from the motion monitoring means causing selection of the next section to be used during the comparison.

15. The improvement of claim 12 wherein said sensor means detects at least two different axes of motion in the machine, and wherein said first signal is generated when any of the following conditions are detected:
   (a) when all axes are stopped and at least one axis then enters a feed conditions;
   (b) motion along one axis is in a feed condition and another axes goes from a stop condition to a feed condition; or
   (c) all axes are in a feed condition and one axis stops.

16. The improvement of claim 15 wherein said second signal is generated under any of the following conditions:
   (a) motion along all axes has stopped; or
   (b) at least one axes is in a rapid transit condition.

17. The improvement of claim 16 wherein motion is sensed with a tachometer that provides an output signal proportional to speed.

18. The improvement of claim 17 which further comprises circuit means defining a stop threshold and a rapid transit threshold, with said circuit means providing an output signal which indicates whether the tachometer output signal is associated with a stop, feed or rapid transit condition.

19. The improvement of claim 18 wherein said circuit means is adapted to delay the generation of said first signal for a period of time sufficient to allow the signal from the tachometer to traverse to above the rapid transit threshold from a stopped condition.

20. The improvement of claim 2 wherein the parameters are selected from the group of power, force, vibration, torque and acoustical emission, and wherein the stored data includes limit values therefore.

* * * * *